UNITED STATES PATENT OFFICE.

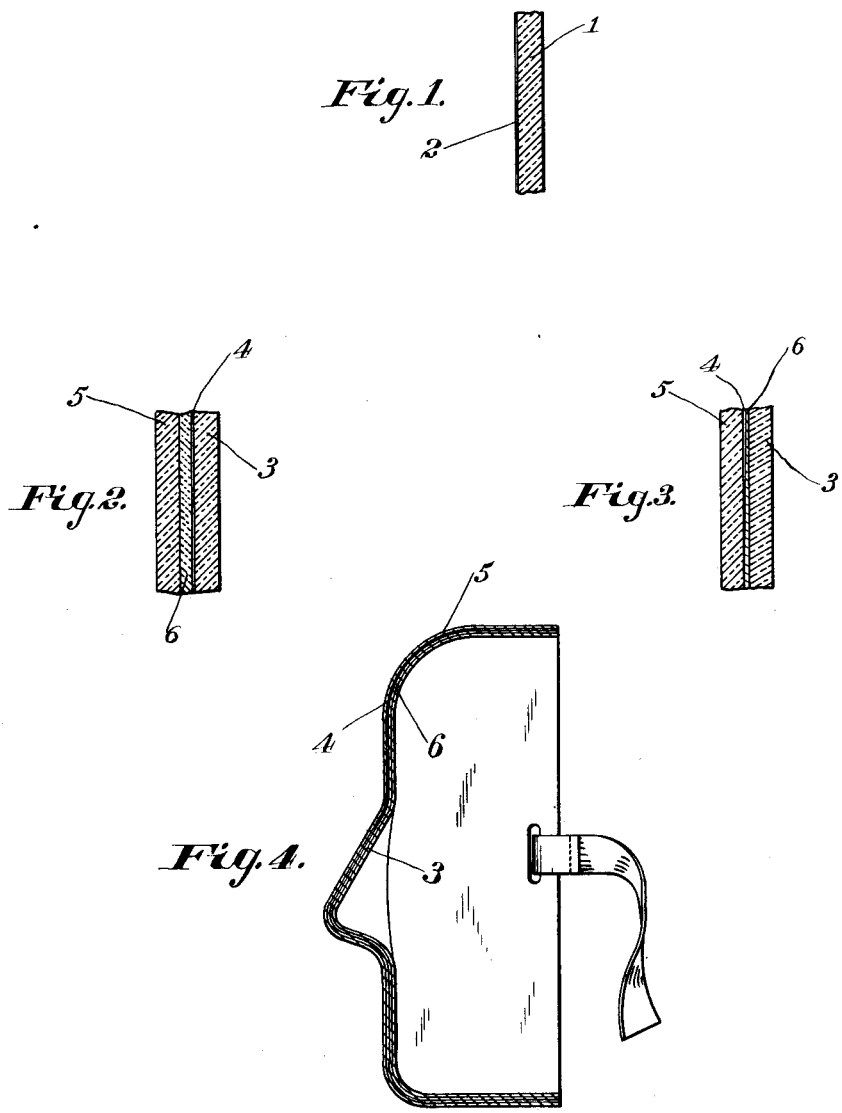

AUGUST HERMAN PFUND, OF BALTIMORE, MARYLAND.

TRANSPARENT SCREEN.

1,176,313.          Specification of Letters Patent.     Patented Mar. 21, 1916.

Application filed March 9, 1915. Serial No. 13,158.

*To all whom it may concern:*

Be it known that I, AUGUST HERMAN PFUND, a citizen of the United States of America, residing at the city of Baltimore, State of Maryland, have invented certain new and useful Improvements in Transparent Screens, of which the following is a specification.

The injurious effect on the eyes of the intense glare and heat to which those employed in metal founding, glass blowing, rolling, stamping and welding operations are exposed, is well known. The normally moist membrane on the surface of the eye-ball is dried and cracked which causes the formation of cataracts, and other injurious results. The injurious effects are found to come from the action of the ultra-violet rays at one end of the spectrum, and the infra-red or heat rays at the other end, for the eye is not injured by the mid-spectrum white light of moderate intensity.

The object of this invention is to provide a transparent protective medium for the eyes or for the entire face which shall prevent the passage of the injurious rays at both ends of the spectrum, and admit a large proportion of the rays of medium wave length at the center of the spectrum. To this end I provide a screen which may be in the form of a lens or mask, or otherwise conveniently arranged, to be interposed between the eye, or the eye and other sensitive parts of the anatomy, and the source of radiation. This screen is composed of two or more superimposed members or elements, one of which serves to filter out or absorb the ultra-violet rays and another of which reflects the infra-red or heat rays, both being transparent in that they allow a large proportion of the mid-spectrum rays to pass.

The powers of selective absorption inherent in colored glass, particularly in yellow, amber and red, but also in some other colors, are comparatively well-known and it has been found that some kinds of glasses transparent to visible light may be opaque to ultra violet. Hereinafter, I use the term colored glass as applied to all mediums having these properties and in using the term glass throughout I include every transparent medium. By imposing such a piece of glass in a beam of light, the ultra-violet rays may be almost entirely eliminated. I also find that by use of a reflector formed by the deposit of a thin film of metal on the surface of a piece of glass, I can turn back substantially all the heat or infra-red rays and that by the combination of colored glass with such a transparent mirror, I can arrest the injurious rays at both ends of the spectrum and thus prevent the passage of all the injurious rays, leaving only the mid-spectrum white light. As the colored glass, if subjected to the heat rays, would become heated by them, the mirror is placed between the colored glass and the source of radiation in the preferred form. While a simple screen of this type may be formed by applying a thin deposit of metal to a piece of colored glass and opposing the metal deposit to the source of heat and light, the thin deposit of metal used is easily scratched and is found more serviceable when protected. For this purpose a layer of clear, colorless glass can be used as this is comparatively non-absorbent and does not become heated to any considerable extent. To avoid internal reflection and refraction, the two pieces of glass are joined by a transparent cement having an index of refraction similar to that of the glass, as Canada balsam or the like. The reflective action of the metallic film may be properly termed selective reflection and the action of the glass whereby the violet rays are interrupted is generally known as selective absorption. By a combination of these two principles, I have attained a long desired result producing a screen which is transparent to the harmless rays in the middle of the spectrum but eliminates entirely the ultra-violet and infra-red or heat rays.

The accompanying drawings are illustrative of my invention.

Figure 1 shows in cross-section a piece of colored glass having a metallic film deposited on one surface; Fig. 2 shows clear colorless glass, colored glass, a metallic film and transparent cement in one arrangement; Fig. 3 shows clear colorless glass, transparent cement, colored glass and metallic film in another arrangement by which the object of my invention may be accomplished; and Fig. 4 shows in cross-section a facial screen or mask made in this way.

Referring to the drawings by numerals, I have shown in Fig. 1 colored glass as red, orange, yellow or the like, 1 having on the surface a thin film, 2 or deposit of metal, as gold, copper, platinum, tungsten, nickel, etc., or alloys. This may be deposited in a vacuum by cathodic sputtering, by electrolysis, a chemical method or by burning in. These and any other methods of deposit are within the scope of my invention, the important point being that I combine a thin film of metal having the property of selective reflection whereby the infra-red rays are interrupted, and a medium having the properties of selective absorption serving to interrupt the ultra-violet rays.

In Fig. 2, I have combined a layer of colored glass 3, as above, a thin film of metal deposited on the surface of the glass at 4, a piece of clear colorless glass 5 and a transparent cement 6 by which the parts are held together and internal refraction and reflection on the opposed surfaces is prevented, the object of this being in effect to eliminate the internal reflecting surfaces.

In Fig. 3 I have shown colored glass 3, clear, colorless glass 5, and a clear cement by which they are joined, the metallic film 4, in this instance, being deposited on the inner surface of the clear glass.

In Fig. 4 I have shown a mask constructed according to the preferred form of my invention with an outer layer of clear glass 5, an inner layer of color glass 3, and an intermediate layer of transparent cement 6, the rear face of the glass 5, being coated with a metallic film 4, having the properties of selective reflection.

It is sometimes desirable, in the case of workmen employed about foundry furnaces or the like, to have means for protecting the eye to a varying degree. The advantage is, that in looking at the glare he has a thick screen in front of his eyes and in looking at other objects below the eye, his vision meets a thinner screen, so he can see objects not highly illuminated. For this purpose the thickness of the reflecting film, and if necessary, the absorbing element may be varied from opaque to transparent to suit the requirements. In every instance, the screen as shown is so formed that it is adapted to be used with the source of light on the left of the drawing. In all the embodiments of the invention shown, the colored glass is the portion of the screen which is next to the eye and for this reason, it is important that its temperature should be normal. As this medium has a tendency to take up some heat rays as well as the ultra-violet rays and thus become heated, the screen is best arranged with the metallic reflector between the colored glass and the source of radiation so that the clear, colorless glass which is non-absorbent as to all radiation and does not become heated, is placed outside the reflector to protect it and is situated between the reflector and the source of radiation. While the colored glass absorbs the ultra-violet rays and the metallic film reflects the infra-red rays, all the mediums used are transparent as to the mid-spectrum or white rays, and while the injurious results of the rays are eliminated, the effect is that of a transparent screen.

Having thus described my invention, what I claim and desire to secure by Letters Patent is:

1. A transparent protective screen composed of a metallic film and glass having the property of selective absorption as to ultra-violet rays.

2. A transparent protective screen composed of superimposed elements including a metallic film and a colored glass plate.

3. A transparent screen for use in protecting the eyes from intense radiation of all wave lights consisting of a plurality of parallel layers including a thin metallic film and a plate of colored glass.

4. A transparent screen for use in protecting the eyes from intense radiation of all wave lights consisting of a plurality of parallel layers including a thin metallic film and a plate of colored glass, the metallic film being placed between the source of radiation and the colored glass plate.

5. A transparent screen for use in protecting the eyes from intense radiation of all wave lights consisting of a plurality of parallel layers including a thin metallic film, a plate of colored glass, the metallic film being placed between the source of radiation and the colored glass plate, and means for protecting the metallic film in the form of a clear glass plate.

6. A transparent screen for use in protecting the eyes from intense radiation of all wave lights consisting of a plurality of parallel layers including a thin metallic film, a plate of colored glass, the metallic film being placed between the source of radiation and the colored glass plate, means for protecting the metallic film in the form of a clear glass plate, and an intermediate layer of transparent cement having an index of refraction substantially equal to that of the glass for joining or eliminating the internal refracting surfaces.

7. A transparent screen composed of a member having the property of selective absorption as to ultra-violet rays, and a member having the property of selective reflection as to infra-red rays.

Signed by me at Baltimore, Maryland, this 2nd day of March 1915.

AUGUST HERMAN PFUND.

Witnesses:
 EDWARD L. BASH,
 H. A. WALDKOENIG.